United States Patent
Tessler et al.

(10) Patent No.: US 12,278,793 B2
(45) Date of Patent: Apr. 15, 2025

(54) SYSTEMS AND METHODS FOR CONVERTING PHYSICAL MEETINGS INTO VIRTUAL MEETINGS

(71) Applicant: Capital One Services, LLC, McLean, VA (US)

(72) Inventors: Leeyat Bracha Tessler, Arlington, VA (US); Tyler Maiman, Melville, NY (US); Phoebe Atkins, Midlothian, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/879,865

(22) Filed: Aug. 3, 2022

(65) Prior Publication Data
US 2024/0048513 A1 Feb. 8, 2024

(51) Int. Cl.
| | |
|---|---|
| *H04L 51/18* | (2022.01) |
| *G06F 3/0482* | (2013.01) |
| *G06N 7/01* | (2023.01) |
| *G06Q 10/1093* | (2023.01) |
| *H04L 51/224* | (2022.01) |
| *H04L 67/52* | (2022.01) |

(52) U.S. Cl.
CPC ............ *H04L 51/18* (2013.01); *G06F 3/0482* (2013.01); *G06N 7/01* (2023.01); *G06Q 10/1095* (2013.01); *H04L 51/224* (2022.05); *H04L 67/52* (2022.05)

(58) Field of Classification Search
CPC ....... H04L 51/18; H04L 51/224; H04L 67/52; G06F 3/0482; G06N 7/01; G06Q 10/1095
See application file for complete search history.

(56) References Cited

U.S. PATENT DOCUMENTS

| | | | |
|---|---|---|---|
| 7,765,478 B2 | 7/2010 | Reed et al. | |
| 10,169,727 B2 | 1/2019 | Hurst et al. | |
| 11,379,799 B1* | 7/2022 | Budkiewicz | ............ H04L 67/60 |
| 2005/0119927 A1* | 6/2005 | Patel | .................... G06Q 10/109 |
| | | | 705/7.19 |
| 2012/0278381 A1 | 11/2012 | Ferlitsch et al. | |
| 2016/0247123 A1 | 8/2016 | Holst et al. | |

(Continued)

FOREIGN PATENT DOCUMENTS

| | | |
|---|---|---|
| JP | 05964248 B2 | 8/2016 |
| WO | 2009015482 A1 | 2/2009 |

*Primary Examiner* — Gil H. Lee
*Assistant Examiner* — Juan C Turriate Gastulo
(74) *Attorney, Agent, or Firm* — TROUTMAN PEPPER LOCKE LLP; Christopher J. Forstner; John A. Morrissett

(57) ABSTRACT

Disclosed embodiments may include a system for converting a physical meeting into a virtual meeting. The system may receive scheduling and location data associated with a first user. The system may determine whether the first user has an upcoming meeting at a physical location, and responsive to such determination, may determine a proximity of the first user to the upcoming meeting. The system may determine, by an MLM and based on the proximity, a probability that the first user will be late to the upcoming meeting. The system may determine whether the probability exceeds a predetermined threshold, and responsive to such determination, may convert the upcoming meeting to a virtual meeting by generating a virtual meeting link, and may transmit, to user device(s), a notification comprising the virtual meeting link.

20 Claims, 4 Drawing Sheets

(56) References Cited

U.S. PATENT DOCUMENTS

| | | | | |
|---|---|---|---|---|
| 2016/0360485 | A1* | 12/2016 | McGavran | G06F 16/9537 |
| 2018/0176383 | A1* | 6/2018 | Kumar | H04L 65/403 |
| 2019/0236554 | A1* | 8/2019 | Hill | G06Q 10/06 |
| 2021/0224754 | A1* | 7/2021 | Zarakas | G06Q 10/1095 |
| 2022/0245596 | A1* | 8/2022 | Nagata | G06Q 10/107 |
| 2022/0270055 | A1* | 8/2022 | Mitchell | H04L 12/1822 |
| 2022/0321548 | A1* | 10/2022 | Pati | H04W 12/06 |
| 2023/0066845 | A1* | 3/2023 | Nagar | G06Q 10/101 |

* cited by examiner

SYSTEMS AND METHODS FOR CONVERTING PHYSICAL MEETINGS INTO VIRTUAL MEETINGS

The disclosed technology relates to systems and methods for converting physical meetings into virtual meetings. Specifically, this disclosed technology relates to converting physical meetings into virtual meetings based on determining whether one or more users are likely to be late to the physical meeting.

BACKGROUND

Traditional systems and methods for meeting scheduling typically involve the use of a calendar software configured such that a meeting organizer may select a time when a group of people are available and/or transmit a calendar meeting invitation to each member of the group. Traditional types of calendar software may be further configured to populate a meeting block on each person's individual calendar based on receiving each person's response (e.g., accept, decline, tentative, etc.) to the meeting invitation.

Accordingly, there is a need for improved systems and methods for converting physical meetings into virtual meetings. Embodiments of the present disclosure are directed to this and other considerations.

SUMMARY

Disclosed embodiments may include a system for converting physical meetings into virtual meetings. The system may include one or more processors, and memory in communication with the one or more processors and storing instructions that, when executed by the one or more processors, are configured to cause the system to convert a physical meeting into a virtual meeting. The system may receive scheduling data associated with a first user. The system may receive location data corresponding to a first user device associated with the first user. The system may determine whether the first user has an upcoming meeting at a physical location based on the scheduling data. Responsive to determining the first user has the upcoming meeting at the physical location, the system may determine a proximity of the first user to the upcoming meeting by comparing a location of the first user device to the physical location, the location based on the location data. The system may determine, by a machine learning model (MLM) and based on the proximity, a probability that the first user will be late to the upcoming meeting. The system may determine whether the probability exceeds a predetermined threshold. Responsive to determining the probability exceeds the predetermined threshold, the system may transmit, to a second user device associated with a second user, a first notification comprising one or more selectable user input objects, and may receive, from the second user device, a first selection of a first selectable user input object. Responsive to receiving the first selection, the system may convert the upcoming meeting to a virtual meeting by generating a virtual meeting link, and may transmit, to the first and second user devices, a first notification comprising the virtual meeting link.

Disclosed embodiments may include a system for converting physical meetings into virtual meetings. The system may include one or more processors, and memory in communication with the one or more processors and storing instructions that, when executed by the one or more processors, are configured to cause the system to convert a physical meeting into a virtual meeting. The system may receive scheduling data associated with a plurality of users, wherein the plurality of users are associated with an upcoming meeting. The system may receive location data corresponding to a respective user device associated with each of the plurality of users. The system may determine whether the upcoming meeting corresponds to a physical location based on the scheduling data. Responsive to determining the upcoming meeting corresponds to the physical location, the system may determine a respective proximity of each of the plurality of users to the upcoming meeting by comparing a respective location of each user device to the physical location, the respective location based on the location data. The system may determine, by an MLM and based on the respective proximity, a probability that a first threshold number of users of the plurality of users will be late to the upcoming meeting. The system may determine whether the probability exceeds a predetermined threshold. Responsive to determining the probability exceeds the predetermined threshold, the system may automatically convert the upcoming meeting to a virtual meeting by generating a virtual meeting link, may modify a graphical user interface (GUI) of the respective user device associated with each of the plurality of users to generate a first modified GUI comprising the virtual meeting link, and may cause the respective user device associated with each of the plurality of users to display the first modified GUI.

Disclosed embodiments may include a system for converting physical meetings into virtual meetings. The system may include one or more processors, and memory in communication with the one or more processors and storing instructions that, when executed by the one or more processors, are configured to cause the system to convert a physical meeting into a virtual meeting. The system may receive scheduling data associated with a user. The system may receive location data corresponding to a user device associated with the user. The system may determine whether the user has an upcoming meeting at a physical location based on the scheduling data. Responsive to determining the user has the upcoming meeting at the physical location, the system may determine a proximity of the user to the upcoming meeting by comparing a location of the user device to the physical location, the location based on the location data. The system may determine, by an MLM and based on the proximity, a probability that the user will be late to the upcoming meeting. The system may determine whether the probability exceeds a predetermined threshold. Responsive to determining the probability exceeds the predetermined threshold, the system may automatically convert the upcoming meeting to a virtual meeting by generating a virtual meeting link, and may transmit, to the user device, a first notification comprising the virtual meeting link.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
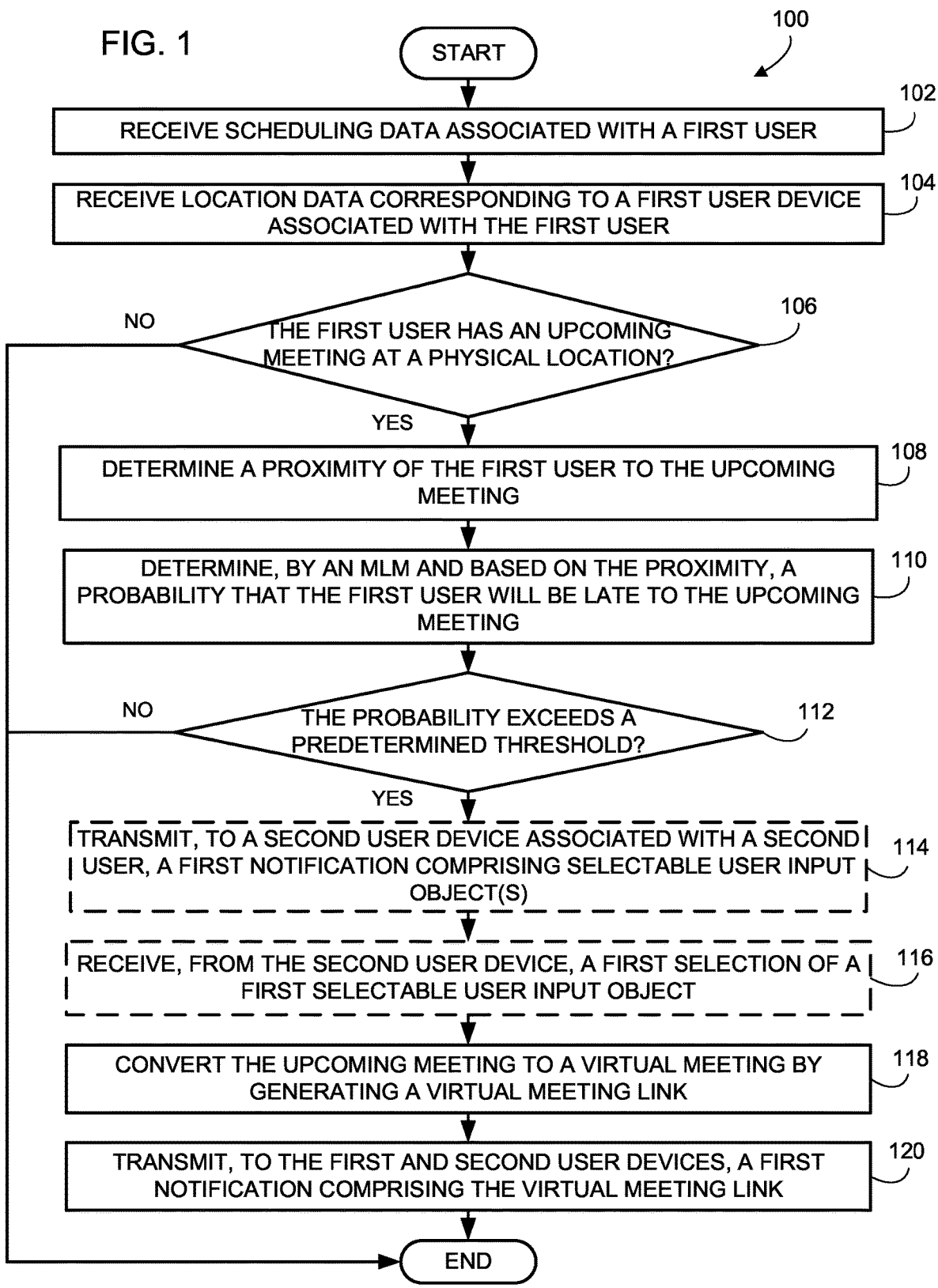
FIG. 1 is a flow diagram illustrating an exemplary method for converting physical meetings into virtual meetings in accordance with certain embodiments of the disclosed technology.

Traditional calendar software and database structures are not built to accommodate data corresponding to multiple locations, such as physical and virtual locations. Further, these systems are typically unable to accommodate locations changing dynamically or in real-time, such as with respect to individual members of a meeting group that may be on the move (e.g., traveling) at the time of a scheduled meeting.

Accordingly, examples of the present disclosure relate to systems and methods for converting physical meetings into virtual meetings. More particularly, the disclosed technology relates to converting physical meetings into virtual meetings based on a probability that a user may arrive late to the scheduled physical meeting. For example, the disclosed technology may provide for receiving scheduling data (e.g., from a user's email, calendar, etc.) and location data (e.g., global positioning system (GPS) data from a user device) associated with a user, and determining a probability that the user may arrive late to the meeting based on the scheduling and location data. Additionally, the disclosed technology may provide for converting the upcoming physical meeting into a virtual meeting by generating a virtual meeting link, and transmitting a notification including the virtual meeting link to one or more users.

Disclosed embodiments may employ machine learning models (MLMs), among other computerized techniques, to determine a probability that one or more users may arrive late to a scheduled physical meeting. Machine learning models are a unique computer technology that involves training models to complete tasks and make decisions. These techniques may help to improve database and network operations. For example, the systems and methods described herein may utilize, in some instances, MLMs, which are necessarily rooted in computers and technology, to determine whether a user may arrive late to a physical meeting based on a proximity of the user to the meeting location and/or one or more additional factors (e.g., what method of transportation the user is likely to use, an approximate speed of that method of transportation, etc.). This, in some examples, may involve using scheduling, location, and/or route-based input data and a prediction and/or estimation type MLM, applied to predict whether a user is likely to arrive late to a physical meeting location. Using an MLM in this way may allow the system to notify one or more users associated with an upcoming meeting that another user may be late, and to automatically convert the physical meeting to a virtual meeting such that all meeting attendees may at least virtually attend. This is a clear advantage and improvement over prior technologies that require users to coordinate scheduling and planning of group meetings, which can provide for many inefficiencies. The present disclosure solves this problem by providing automatic converting of physical meetings into virtual meetings based on the monitoring of users' schedules and current locations.

The systems and methods described herein further utilize, in some instances, graphical user interfaces (GUIs), which are necessarily rooted in computers and technology. Graphical user interfaces are a computer technology that allows for user interaction with computers through touch, pointing devices, or other means. The present disclosure details modifying GUIs of user mobile devices to include a newly generated virtual meeting link, and causing the mobile devices to display the modified GUIs. This, in some examples, may involve using various users' scheduling and location-based data to dynamically change the GUI so that the GUI provides users with an indication as to whether other users may arrive late to an upcoming meeting, as well as an opportunity to conduct the meeting more efficiently by using the virtual meeting link no matter each meeting attendee's current location. This is a clear advantage and improvement over prior technologies that require users to coordinate the schedules of a group of users, and make any meeting formatting changes (e.g., sending out a virtual meeting link or conference telephone number, or rescheduling the meeting completely) at the time the meeting is supposed to begin based on discovering certain group members will be late. The present disclosure solves this problem by automatically converting a physical meeting into a virtual meeting, and providing the virtual meeting link to the group before the meeting is scheduled to begin.

Furthermore, examples of the present disclosure may also improve the speed with which computers can monitor users' schedules and locations, and modify meeting formats based on those schedules and locations. Overall, the systems and methods disclosed have significant practical applications in the scheduling field because of the noteworthy improvements of automated meeting format conversion, and user notification, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for converting physical meetings into virtual meetings, in accordance with certain embodiments of the disclosed technology. The steps of method 100 may be performed by one or more components of the system 400 (e.g., prediction system 320 or web server 410 of meeting conversion system 408 or user device 402), as described in more detail with respect to FIGS. 3 and 4.

In block 102, the prediction system 320 may receive scheduling data associated with a first user. In some embodiments, the scheduling data may include calendar data, web conferencing data, email data, and the like. The scheduling data may include any type of data corresponding to the first user's day-to-day schedule. For example, the scheduling data may include various file types (e.g., iCalendar, Google calendar, Outlook events, etc.), and/or functional descriptions (e.g., digital representations of meetings with attendees, meeting start and end times, etc.). In some embodiments, the first user may have previously elected to connect his/her schedule, calendar, email, etc. to prediction system 320 such that the system could continuously monitor the data. For example, an organization that owns and/or operates prediction system 320 may have previously prompted the first user (e.g., via an affiliated application) to provide the organization with access to the first user's schedule, calendar, email, etc.

In block 104, the prediction system 320 may receive location data corresponding to a first user device associated with the first user. For example, the location data may include a general location as to the first user's whereabouts (e.g., flight information providing cities or states to and from which the first user is traveling), and/or specific location information (e.g., latitude and longitude coordinates, a specific office building, etc.). In some embodiments, the location data may include GPS data, or any other location-tracking technology, for example, transmitted via the first user's mobile device.

In block 106, the prediction system 320 may determine whether the first user has an upcoming meeting (e.g., a meeting scheduled to begin at a future time) at a physical location based on the scheduling data. The physical location may include, for example, a specific office building, a floor of an office building, a conference room, a city, a state, etc. In some embodiments, the system may be configured to continuously monitor the first user's calendar to determine whether an upcoming meeting on the user's calendar is associated with a physical location, such as in a specific geographic location, building, conference room, etc.

In block 108, responsive to determining the first user has the upcoming meeting at the physical location, the prediction system 320 may determine a proximity of the first user to the upcoming meeting by comparing a location of the first user device to the physical location, the location based on the location data. For example, the system may be configured to determine that the first user is a certain approximate distance (e.g., in feet, miles, etc.) from the physical meeting location.

In block 110, the prediction system 320 may determine, by an MLM and based on the proximity, a probability that the first user will be late to the upcoming meeting. In some embodiments, the MLM may be trained using historical scheduling and/or location data corresponding to the first user or a variety of other similar users (e.g., employees of the same organization as the first user), and/or data associated with various means of transportation. For example, the MLM may be trained to determine, based on the proximity between the first user and the physical meeting location, one or more different means of transportation that the first user may take to arrive at the physical location. For example, if the MLM determines the first user is only approximately 40 feet away from the physical location (e.g., on a different floor of a building), the MLM may determine that the user may walk to the physical location. In such example, the MLM may be trained to determine approximately how long it may take the first user to walk from his/her current location to the meeting location to determine whether the first user may be late to the meeting. As another example, if the MLM determines the first user is 10 miles away from the physical location, the MLM may determine that the user may drive, take a bus, or take a metro (e.g., depending on available means of transportation in the first user's current geographic location) to get to the meeting location. The MLM may then determine approximately how long it may take the user, using one or more of the selected means of transportation, to arrive at the meeting location. As another example, if the MLM determines the first user is 300 miles away from the meeting location (e.g., in a different city or state), the MLM may determine that the first user may take a train or airplane to get to the meeting location, and estimate how long it make take the first user to arrive at the meeting location based on potential train and/or airplane routes.

In some embodiments, the system may have access to additional travel-related data associated with the first user, such as travel reservations (e.g., via the scheduling data). In such embodiments, the MLM may be configured to utilize the travel reservation data, for example, to recognize that the first user has a booked train ticket to get from one location to another. The MLM may be configured to determine an approximate amount of time it may take the user to reach the meeting location based on departure and/or arrival location and/or time information contained within the train ticket, and/or publicly available information pertaining to the train schedule. In some embodiments, the system may be configured to monitor the first user's travel reservation data and/or other publicly available travel data to determine if any changes have occurred. For example, if the system recognizes the first user has a reserved plane ticket, the system may be configured to monitor the first user's plane or flight number to determine if any changes occur (e.g., a delay, cancellation, etc.) that may impact the likelihood that the first user will arrive on time to the meeting location.

In some embodiments, the system may have access to security system data, such as key card information associated with users (e.g., employees) who have badged into a secure building. In such embodiments, the MLM may be configured to determine the probability that the first user will be late to the upcoming meeting based on the security system data. For example, the system may be configured to recognize that the first user has badged into a specific building and/or floor of a building. The system may utilize this information in determining whether the user may be late to an upcoming meeting, for example, by determining that while the user has 15 minutes until a meeting is scheduled to begin, it will likely take the user at least 18 minutes to walk from his/her current location to the meeting location (e.g., in a different building or on a different floor).

In block 112, the prediction system 320 may determine whether the probability exceeds a predetermined threshold. In some embodiments, the predetermined threshold may include a percent probability that the user may be late. For example, the system may be configured to determine whether the probability exceeds a 50 percent chance that the first user will be late.

In optional block 114, responsive to determining the probability exceeds the predetermined threshold, the prediction system 320 may transmit, to a second user device associated with a second user, a first notification comprising one or more selectable user input objects. In some embodiments, the second user may be different from the first user. For example, the first user may be an invitee to the upcoming meeting, while the second user may be the meeting organizer associated with the upcoming meeting. The system may be configured to recognize which user of a group of users is a meeting organizer based on information contained within the scheduling data. For example, users' calendar meeting invitations may include information associated with a meeting organizer, one or more "required" invitees, one or more "optional" invitees, one or more "notified" invitees (e.g., invitees whom the meeting organizer wanted to ensure knew of the meeting, but did not necessarily expect to attend), etc.

In some embodiments, the notification may include a push-notification to the second user's device (e.g., mobile phone), a text message, a phone call, an email, etc. In some embodiments, the second notification may notify the second user that the first user may arrive late to the upcoming meeting and/or that the meeting has already been converted to a virtual meeting. In some embodiments, the notification may provide the second user a means for deciding whether to convert the physical meeting into a virtual meeting. For example, the notification may include one or more selectable user input objects. The selectable user input object(s) may include, for example, click buttons, dropdown menu selectors, links, and the like. The selectable user input object(s) may provide the second user with options for whether to convert the physical meeting into a virtual meeting. For example, the notification may include a prompt that states: "Would you like to convert this meeting to a virtual meeting?" The notification may further include one or more click buttons that read "yes" or "no."

In some embodiments, the system may be configured to determine one or more additional users (e.g., other than the first user and/or second user) associated with the upcoming meeting based on the scheduling data. Responsive to determining the probability exceeds the predetermined threshold, the system may be configured to transmit a notification to a respective user device associated with each of the additional users. For example, the notification may provide an indication to the additional users that the upcoming meeting has changed to a virtual meeting and/or include the virtual meeting link.

In some embodiments, the system may be configured to determine, by the MLM, one or more routes between the location of the first user and the physical location of the upcoming meeting. For example, the system may be configured to determine one or more routes that the first user might take (e.g., by foot, car, bike, train, etc.) to get from his/her current location to the location of the meeting. The system may be configured to transmit a notification to the first user including the one or more determined route options. In some embodiments, the notification may further include a respective amount of time associated with each of the determined route options, where the amount of time indicates approximately how long it may take the first user to reach the meeting location.

In some embodiments, the system may be configured to generate, and include within the notification, an interactive map showing the different route options. In some embodiments, the notification and/or the interactive map may list and/or show the different route options along with a respective arrival time and/or probability that the first user will arrive on time to the upcoming meeting if the first user takes one of the route options. In some embodiments, the system may be configured to transmit the interactive map to one or more additional users besides the first user, for example, a meeting organizer and/or other users determined to be invitees to the upcoming meeting, such that those additional users are better informed of when the first user may arrive at the meeting location.

In optional block 116, the prediction system 320 may receive, from the second user device, a first selection of a first selectable user input object. For example, as discussed above, the second user (e.g., the meeting organizer) may select one of the selectable user input objects included within the notification to indicate to the system whether the second user would like to convert the physical meeting into a virtual meeting.

In block 118, the prediction system 320 may convert the upcoming meeting to a virtual meeting by generating a virtual meeting link. In some embodiments, the system may be configured to automatically convert the upcoming meeting to a virtual meeting based on determining the probability of the first user being late exceeds the predetermined threshold, as discussed above. In some embodiments, the system may be configured to conduct the conversion based on receiving the selection of one or more of the selectable user input objects from the second user, as discussed above.

In some embodiments, the system may be configured to convert the upcoming meeting to a virtual meeting based on determining whether the first user is a necessary invitee for conducting the meeting. In some embodiments, this determination may be based on the scheduling data, such as by recognizing the first user was listed as an "optional" invitee in the original calendar invitation, as discussed above. In some embodiments, the system may be configured to make this determination via the MLM. For example, the MLM may base the determination on one or more factors, such as the title of the first user (e.g., "President," "Manager," "Technical Specialist," etc.), whether this particular meeting has been postponed in the past based on the first user being late or unavailable (e.g., indicating the first user is necessary to the meeting), previous user feedback (e.g., user responses to prompts requesting users indicate how important meetings were to them in their specific business roles), and the like. In some embodiments, the system may be configured to use the above-described determinations in an automatic determination to convert the physical meeting into a virtual meeting. In some embodiments, the system may be configured to transmit a prompt to one or more users (e.g., the first user, the meeting organizer, etc.) such that the user(s) may indicate whether the first user needs or should be included in the meeting. For example, if the user(s) indicate the first user must attend the meeting, the system may be configured to convert the meeting into a virtual meeting to ensure the first user can at least virtually attend no matter the first user's current location. As another example, if the user(s) indicate the first user need not attend the meeting, the system may be configured to not convert the meeting into a virtual meeting such that the remaining meeting invitees can proceed to meet in person as originally scheduled.

In block 120, the prediction system 320 may transmit, to the first and second user devices, a first notification comprising the virtual meeting link. For example, the system may be configured to generate a notification (e.g., push-notification, email, in-application pop-up notification, etc.) including the virtual meeting link, and to transmit the notification to the first and second user devices. In some embodiments, the system may be configured to transmit the notification to one or more additional users, as discussed above.

Figure 2:
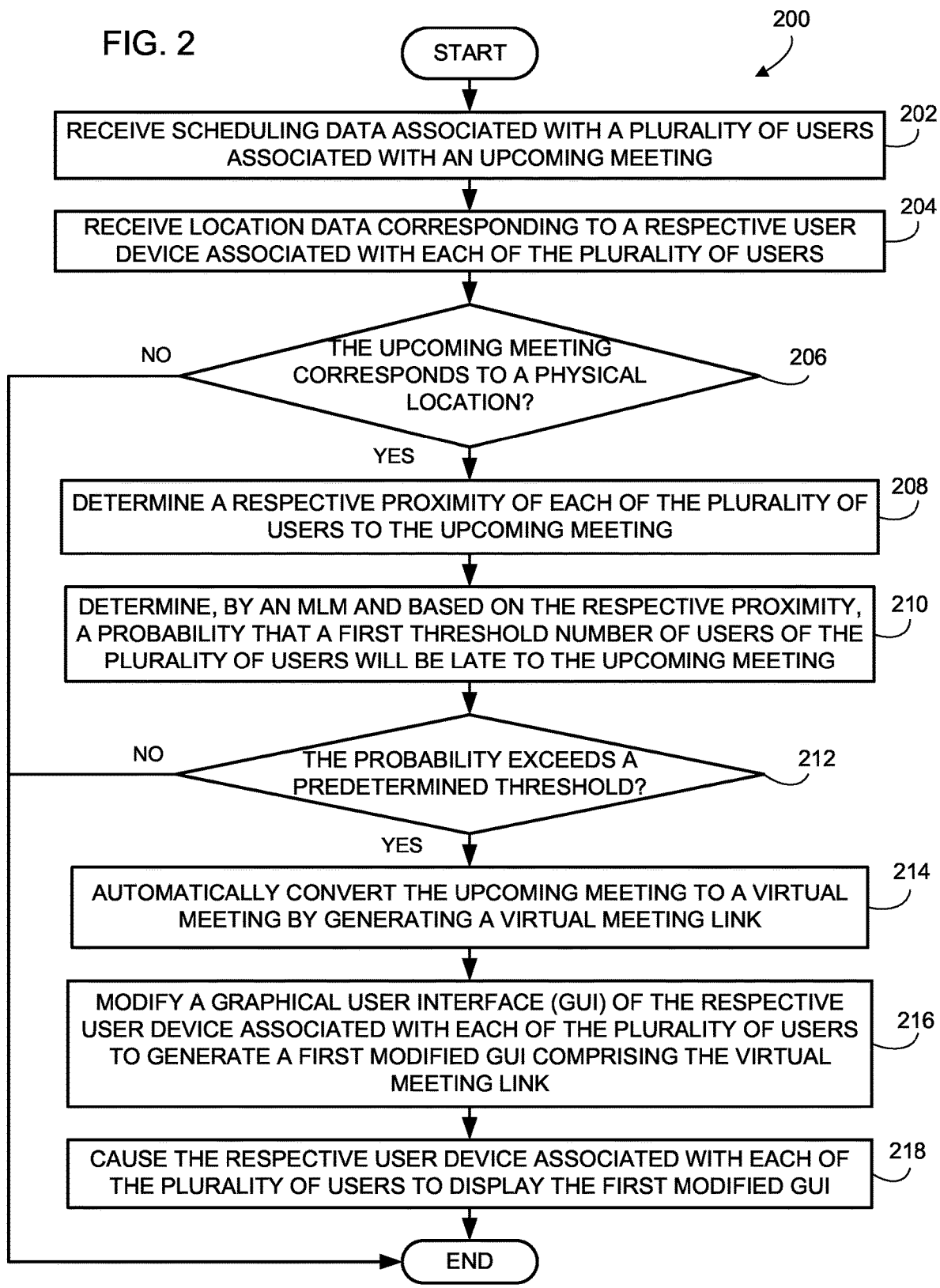
FIG. 2 is a flow diagram illustrating an exemplary method for converting physical meetings into virtual meetings in accordance with certain embodiments of the disclosed technology.

FIG. 2 is a flow diagram illustrating an exemplary method 200 for converting physical meetings into virtual meetings, in accordance with certain embodiments of the disclosed technology. The steps of method 200 may be performed by one or more components of the system 400 (e.g., prediction system 320 or web server 410 of meeting conversion system 408 or user device 402), as described in more detail with respect to FIGS. 3 and 4.

Method 200 of FIG. 2 is similar to method 100 of FIG. 1, except that method 200 may include tracking scheduling and location data corresponding to a plurality of users, and generating a modified GUI including a newly generated virtual meeting link. The descriptions of blocks 206, 212, and 214 in method 200 may be the same as or similar to the respective descriptions of blocks 106, 112, and 118 of method 100 and are not repeated herein for brevity. However, blocks 202, 204, 206, 208, and 210 are different from blocks 102, 104, 106, 108, and 110 and are described below, as well as additional blocks 216 and 218.

In block 202, the prediction system 320 may receive scheduling data associated with a plurality of users, wherein the plurality of users are associated with an upcoming meeting. This step may be similar to block 102 of method 100; however, the system may be configured to receive respective scheduling data associated with a plurality of users such that the system may track and compare scheduling data of a plurality of users (e.g., professional colleagues). The system may be configured to recognize when a plurality of users may be associated with an upcoming meeting based on the scheduling data, as discussed above. A benefit of the system being configured to receive scheduling data associated with a plurality of users is that the system may be configured to automatically compare users' schedules, and respective location data, as further discussed below, to determine whether one or multiple users may be late to an upcoming meeting.

In block 204, the prediction system 320 may receive location data corresponding to a respective user device associated with each of the plurality of users. This step may be similar to block 104 of method 100; however, the system may be configured to receive location data corresponding to a respective user device associated with each of a plurality of users such that the system may track and compare location data of a plurality of users (e.g., professional colleagues).

In block 208, the prediction system 320 may determine a respective proximity of each of the plurality of users to the upcoming meeting by comparing a respective location of each user device to the physical location, the respective location based on the location data. This step may be similar to block 108 of method 100; however, the system may be configured to determine a respective proximity for each of the plurality of users.

In block 210, the prediction system 320 may determine, by an MLM and based on the respective proximity, a probability that a first threshold number of users of the plurality of users will be late to the upcoming meeting. The first threshold number of users may be any specific number of percentage of users, for example, at least three users, at least 75 percent of total users, and the like. For example, the system may be configured to determine whether a majority (e.g., at least 51 percent) of all meeting invitees will likely be late to the upcoming meeting. In some embodiments, the system may be configured to determine the first threshold number based on one or more numbers previously entered by a user, such as a meeting organizer. In some embodiments, the system may be configured to determine an optimal value or percentage for the first threshold number based on, for example, the total number of meeting invitees, the number of "required" versus "optional" invitees (as discussed above), and any other applicable information contained within the received scheduling data.

In block 216, responsive to determining the probability exceeds a predetermined threshold (as discussed above), the prediction system 320 may modify a GUI of the respective user device associated with each of the plurality of users to generate a modified GUI including the virtual meeting link. For example, the system may be configured to generate a modified GUI that includes the original physical location of the meeting now located at the bottom of the screen and/or in a different format as in the original GUI (e.g., shown in red with a strike through line, instead of in black). The modified GUI may also include the virtual meeting link, for example, appearing at the top of the screen and/or within a green or bold border. In some embodiments, the modified GUI may include a map of the location data associated with each user, e.g., an interactive map as discussed above, such that each user may have a real-time indication of where each of the other meeting invitees is currently located and/or when each of the other meeting invitees may arrive at the meeting location. The modification of the GUI, including one or more changes in formatting, color, layout, etc., may provide an enhanced notification to each of the plurality of users such that they are aware the meeting format has changed.

In block 218, responsive to determining the probability exceeds a predetermined threshold, the prediction system 320 may cause the respective user device associated with each of the plurality of users to display the first modified GUI, as discussed above.

In some embodiments, further responsive to determining the probability exceeds a predetermined threshold, the system may be configured to transmit, to the respective user device associated with each of the plurality of users, a first notification comprising one or more selectable user input objects, and to receive, from one or more of the respective user devices, a first selection of a first selectable user input object, as discussed above with respect to blocks 114 and 116 of method 100. The system may be configured to determine whether the one or more of the respective user devices exceeds a second threshold number of the respective user devices, and to convert the meeting into a virtual meeting based on such determination. For example, the system may be configured to determine whether at least 50 percent of the plurality of users (e.g., meeting invitees) agree that the meeting should be converted to a virtual meeting, such as by receiving at least 50 percent "yes" responses via the transmitted notifications. The system may be configured to automatically convert the meeting into a virtual meeting, as discussed herein, based on receiving the at least 50 percent "yes" responses.

Figure 3:
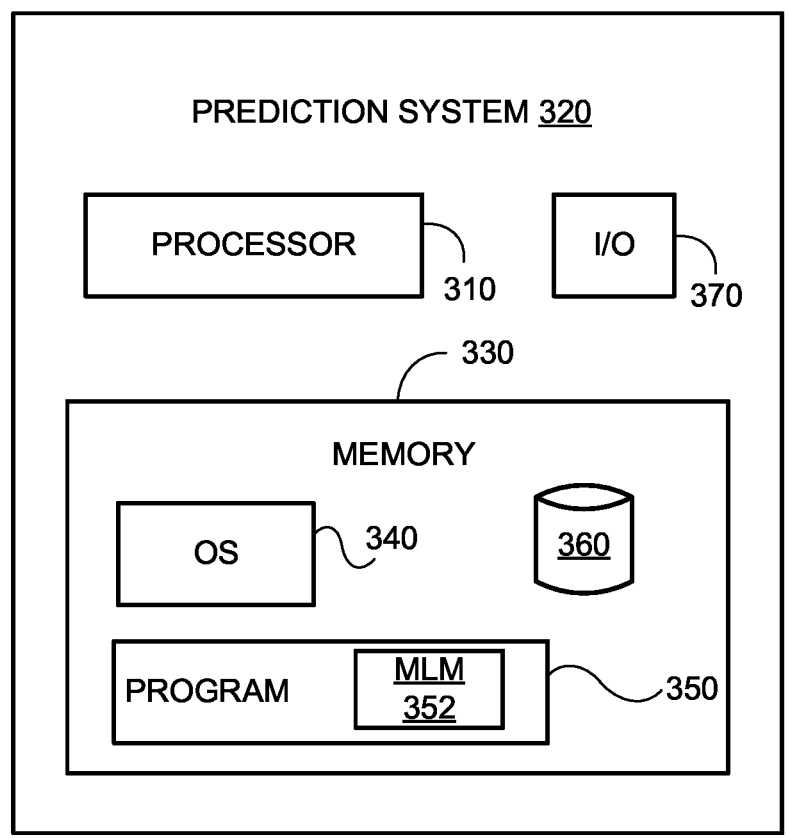
FIG. 3 is block diagram of an example prediction system used for converting physical meetings into virtual meetings, according to an example implementation of the disclosed technology.
Figure 4:
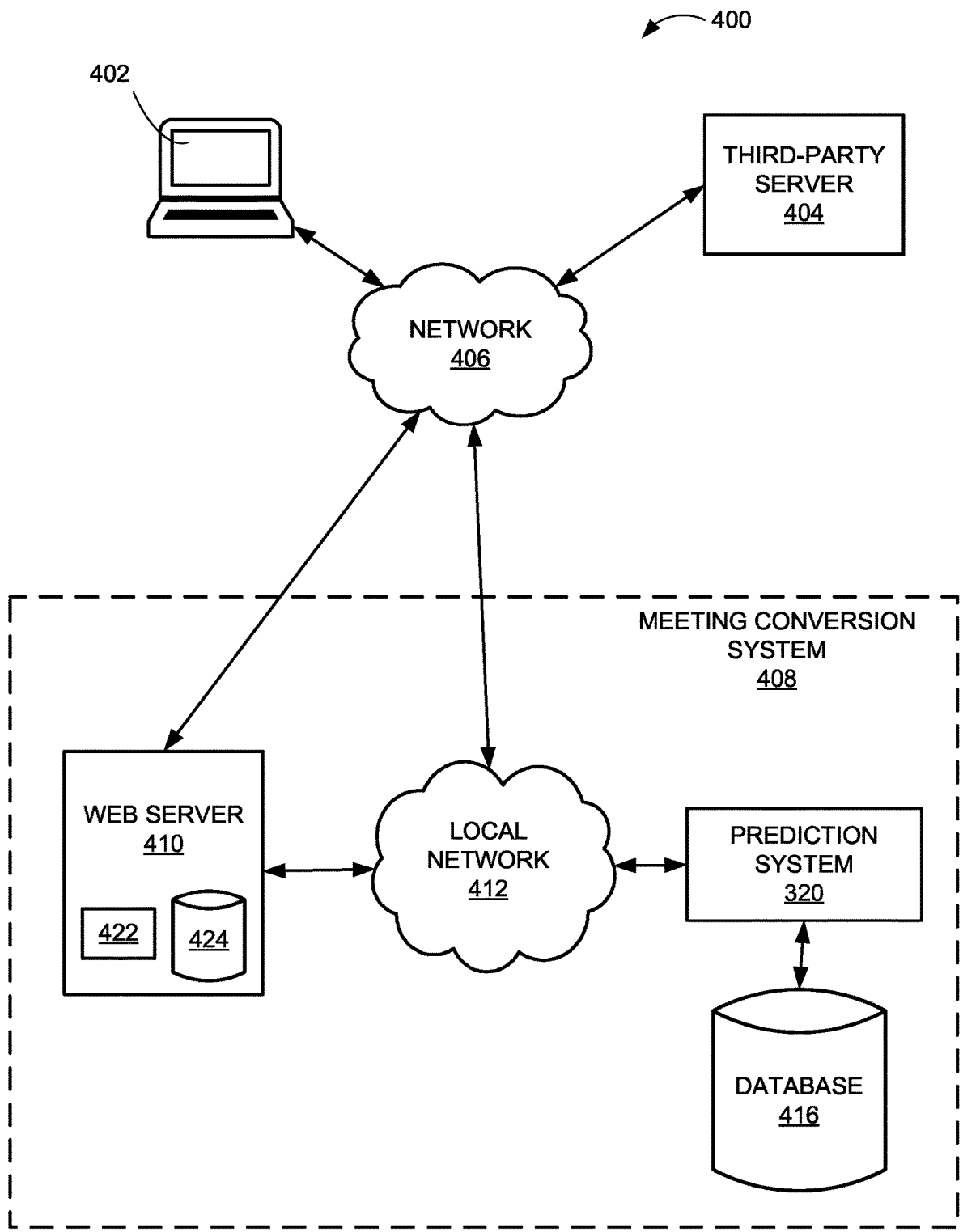
FIG. 4 is block diagram of an example system that may be used for converting physical meetings into virtual meetings, according to an example implementation of the disclosed technology.

FIG. 3 is a block diagram of an example prediction system 320 used to predict whether one or more users may arrive late to an upcoming physical meeting, according to an example implementation of the disclosed technology. According to some embodiments, the user device 402 and web server 410, as depicted in FIG. 4 and described below, may have a similar structure and components that are similar to those described with respect to prediction system 320 shown in FIG. 3. As shown, the prediction system 320 may include a processor 310, an input/output (I/O) device 370, a memory 330 containing an operating system (OS) 340 and a program 350. In some embodiments, program 350 may include an MLM 352 that may be trained, for example, to determine whether a user may arrive late to an upcoming meeting. In certain implementations, MLM 352 may issue commands in response to processing an event, in accordance with a model that may be continuously or intermittently updated. Moreover, processor 310 may execute one or more programs (such as via a rules-based platform or the trained MLM 352), that, when executed, perform functions related to disclosed embodiments.

In certain example implementations, the prediction system 320 may be a single server or may be configured as a distributed computer system including multiple servers or computers that interoperate to perform one or more of the processes and functionalities associated with the disclosed embodiments. In some embodiments prediction system 320 may be one or more servers from a serverless or scaling server system. In some embodiments, the prediction system 320 may further include a peripheral interface, a transceiver, a mobile network interface in communication with the processor 310, a bus configured to facilitate communication between the various components of the prediction system 320, and a power source configured to power one or more components of the prediction system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™ low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the prediction system 320 may include one or more storage devices configured to store information used by the processor 310 (or other components) to perform certain functions related to the disclosed embodiments. In one example, the prediction system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The prediction system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the prediction system 320 may include the memory 330 that may include one or more programs 350 to perform one or more functions of the disclosed embodiments. For example, in some embodiments, the prediction system 320 may additionally manage dialogue and/or other interactions with the customer via a program 350.

The processor 310 may execute one or more programs 350 located remotely from the prediction system 320. For example, the prediction system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a prediction system database 360 for storing related data to enable the prediction system 320 to perform one or more of the processes and functionalities associated with the disclosed embodiments.

The prediction system database 360 may include stored data relating to status data (e.g., average session duration data, location data, idle time between sessions, and/or average idle time between sessions) and historical status data. According to some embodiments, the functions provided by the prediction system database 360 may also be provided by a database that is external to the prediction system 320, such as the database 416 as shown in FIG. 4.

The prediction system 320 may also be communicatively connected to one or more memory devices (e.g., databases) locally or through a network. The remote memory devices may be configured to store information and may be accessed and/or managed by the prediction system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The prediction system 320 may also include one or more I/O devices 370 that may comprise one or more interfaces for receiving signals or input from devices and providing signals or output to one or more devices that allow data to be received and/or transmitted by the prediction system 320. For example, the prediction system 320 may include interface components, which may provide interfaces to one or more input devices, such as one or more keyboards, mouse devices, touch screens, track pads, trackballs, scroll wheels, digital cameras, microphones, sensors, and the like, that enable the prediction system 320 to receive data from a user (such as, for example, via the user device 402).

In examples of the disclosed technology, the prediction system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The prediction system 320 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another MLM. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The prediction system 320 may be configured to adjust model parameters during training. Model parameters may include weights, coefficients, offsets, or the like. Training may be supervised or unsupervised.

The prediction system 320 may be configured to train MLMs by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The prediction system 320 may be configured to optimize statistical models using known optimization techniques.

Furthermore, the prediction system 320 may include programs configured to retrieve, store, and/or analyze properties of data models and datasets. For example, prediction system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other MLM.

The prediction system 320 may include algorithms to determine a data type, key-value pairs, row-column data structure, statistical distributions of information such as keys or values, or other property of a data schema may be configured to return a statistical profile of a dataset (e.g., using a data-profiling model). The prediction system 320 may be configured to implement univariate and multivariate statistical methods. The prediction system 320 may include a regression model, a Bayesian model, a statistical model, a linear discriminant analysis model, or other classification model configured to determine one or more descriptive metrics of a dataset. For example, prediction system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The prediction system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, prediction system 320 may be configured to generate a similarity metric representing a measure of similarity between data in a dataset. A similarity metric may be based on a correlation, covariance matrix, a variance, a frequency of overlapping values, or other measure of statistical similarity.

The prediction system 320 may be configured to generate a similarity metric based on data model output, including data model output representing a property of the data model. For example, prediction system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The prediction system 320 may be configured to classify a dataset. Classifying a dataset may include determining whether a dataset is related to another dataset(s). Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as a node diagram, a tree diagram, or a vector diagram of datasets. Classifying a dataset may include estimating a likelihood that a dataset relates to another dataset, the likelihood being based on the similarity metric.

The prediction system 320 may include one or more data classification models to classify datasets based on the data schema, statistical profile, and/or edges. A data classification model may include a convolutional neural network, a random forest model, a recurrent neural network model, a support vector machine model, or another MLM. A data classification model may be configured to classify data elements as actual data, synthetic data, related data, or any other data category. In some embodiments, prediction system 320 is configured to generate and/or train a classification model to classify a dataset, consistent with disclosed embodiments.

The prediction system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Prediction models may additionally or alternatively include classification and regression trees, or other types of models known to those skilled in the art. To generate prediction models, the prediction system may analyze information applying machine-learning methods.

While the prediction system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the prediction system 320 may include a greater or lesser number of components than those illustrated.

FIG. 4 is a block diagram of an example system that may be used to view and interact with meeting conversion system 408, according to an example implementation of the disclosed technology. The components and arrangements shown in FIG. 4 are not intended to limit the disclosed embodiments as the components used to implement the disclosed processes and features may vary. As shown, meeting conversion system 408 may interact with a user device 402 and/or a third-party server 404 via a network 406. In some embodiments, the third-party server 404 may be affiliated (e.g., own and/or operate) certain programs and/or applications, such as an email server/provider, a calendar application, location tracking application, etc. In some embodiments, the meeting conversion system 408 may include a local network 412, a prediction system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the meeting conversion system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the meeting conversion system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi™ networks. In some embodiments, the network 406 may connect terminals, services, and mobile devices using direct connections such as RFID, NFC, Bluetooth™ BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The meeting conversion system 408 may be associated with and optionally controlled by one or more entities such as a business, corporation, individual, partnership, or any other entity that provides one or more of goods, services, and consultations to individuals such as customers. In some embodiments, the meeting conversion system 408 may be controlled by a third party on behalf of another business, corporation, individual, partnership. The meeting conversion system 408 may include one or more servers and computer systems for performing one or more functions associated with products and/or services that the organization provides.

Web server 410 may include a computer system configured to generate and provide one or more websites accessible to customers, as well as any other individuals involved in accessing meeting conversion system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that is authenticated by the prediction system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi™, Bluetooth™, Ethernet, and other suitable network connections that enable components of the meeting conversion system 408 to interact with one another and to connect to the network 406 for interacting with components in the system 400 environment. In some embodiments, the local network 412 may include an interface for communicating with or linking to the network 406.

In other embodiments, certain components of the meeting conversion system 408 may communicate via the network 406, without a separate local network 406.

The meeting conversion system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access meeting conversion system 408 using the cloud computing environment. User device 402 may be able to access meeting conversion system 408 using specialized software. The cloud computing environment may eliminate the need to install specialized software on user device 402.

In accordance with certain example implementations of the disclosed technology, the meeting conversion system 408 may include one or more computer systems configured to compile data from a plurality of sources, such as the prediction system 320, web server 410, and/or the database 416, for example. The prediction system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

In one example, a system may be configured to access a user's schedule via a calendar associated with the user's email address. The system may further receive GPS location data associated with the user's mobile device such that the system may monitor the user's location, at least during business hours (or other time periods enabled by the user). The system may determine that the user has a meeting scheduled for the following day and taking place in a physical location based on recognizing such meeting and location on the user's calendar. Based on tracking the user's current location, the system may determine how far away from the physical location the user currently is. For example, the system may determine the user's current location to be in Richmond, Virginia, while the meeting is scheduled for the following day in Atlanta, Georgia.

Using an MLM, the system may determine a probability that the user will be late to the Atlanta-based meeting. The MLM may be configured to determine such probability based on a variety of factors. For example, the system may have access to the user's flight information via her calendar and may recognize that the user is scheduled to be on a non-stop flight from Richmond, Virginia to Atlanta, Georgia the following morning, prior to the start of the meeting. The system may also recognize that once the user lands in Atlanta, she has a scheduled reservation to pick up a rental car at the airport. The system may estimate the amount of time it will likely take the user to drive from the Atlanta airport to the office where the meeting is scheduled to take place. The system may also access publicly available information associated with the user's flight and recognize that the user's flight has a departure delay of a certain period of time, which may add to the amount of time it may take the user to land in the Atlanta airport, and thus arrive at the meeting location. Taking these factors into account, the system, via the MLM, may determine a probability that the user will be late to the meeting. For example, the system may determine there is a 25 percent chance the user will be late.

Based on the scheduling data, the system may determine that a second and different user is the organizer of the Atlanta-based meeting, and thus may be configured to transmit a notification to the second user to request the second user indicate whether he would like to convert the meeting into a virtual meeting. The system may receive a response from the second user via the second user pressing a click button prompt within the notification.

Based on receiving the second user's response, such as a "yes" response, the system may generate a virtual meeting link. The system may be configured to then transmit a notification, including the virtual meeting link, to the first and second users, along with all other meeting invitees (e.g., determined via the user's schedule).

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive scheduling data associated with a first user; receive location data corresponding to a first user device associated with the first user; determine whether the first user has an upcoming meeting at a physical location based on the scheduling data; responsive to determining the first user has the upcoming meeting at the physical location, determine a proximity of the first user to the upcoming meeting by comparing a location of the first user device to the physical location, the location based on the location data; determine, by a machine learning model (MLM) and based on the proximity, a probability that the first user will be late to the upcoming meeting; determine whether the probability exceeds a predetermined threshold; and responsive to determining the probability exceeds the predetermined threshold: transmit, to a second user device associated with a second user, a first notification comprising one or more selectable user input objects; receive, from the second user device, a first selection of a first selectable user input object; and responsive to receiving the first selection: convert the upcoming meeting to a virtual meeting by generating a virtual meeting link; and transmit, to the first and second user devices, a first notification comprising the virtual meeting link.

Clause 2: The system of clause 1, wherein the scheduling data comprises one or more of calendar data, web conferencing data, email data, or combinations thereof.

Clause 3: The system of clause 1, wherein the location data comprises Global Positioning System (GPS) data.

Clause 4: The system of clause 1, wherein determining the probability that the first user will be late to the upcoming meeting is further based on one or more of a method of transportation, a speed of the method of transportation, historical scheduling data, historical location data, security system data, or combinations thereof.

Clause 5: The system of clause 1, wherein the instructions are further configured to cause the system to: determine one or more additional users associated with the upcoming meeting based on the scheduling data; and responsive to determining the probability exceeds the predetermined threshold: transmit a second notification to a respective user device associated with each of the one or more additional users, the second notification comprising the virtual meeting link.

Clause 6: The system of clause 1, wherein the instructions are further configured to cause the system to: responsive to determining the probability exceeds the predetermined threshold: determine, by the MLM, one or more routes between the location of the first user and the physical location; and transmit, to the first user device, a second notification comprising the one or more routes.

Clause 7: The system of clause 6, wherein the instructions are further configured to cause the system to: responsive to determining the probability exceeds the predetermined threshold: determine, by the MLM, an amount of time associated with each of the one or more routes, wherein the amount of time is indicative of how long it may take the first user to reach the physical location, and wherein the second notification further comprises the amount of time.

Clause 8: A system, comprising: one or more processors; and a memory in communication with the one or more processors and storing instructions that, when executed by the one or more processors, are configured to cause the system to: receive scheduling data associated with a plurality of users, wherein the plurality of users are associated with an upcoming meeting; receive location data corresponding to a respective user device associated with each of the plurality of users; determine whether the upcoming meeting corresponds to a physical location based on the scheduling data; responsive to determining the upcoming meeting corresponds to the physical location, determine a respective proximity of each of the plurality of users to the upcoming meeting by comparing a respective location of each user device to the physical location, the respective location based on the location data; determine, by a machine learning model (MLM) and based on the respective proximity, a probability that a first threshold number of users of the plurality of users will be late to the upcoming meeting; determine whether the probability exceeds a predetermined threshold; and responsive to determining the probability exceeds the predetermined threshold: automatically convert the upcoming meeting to a virtual meeting by generating a virtual meeting link; modify a graphical user interface (GUI) of the respective user device associated with each of the plurality of users to generate a first modified GUI comprising the virtual meeting link; and cause the respective user device associated with each of the plurality of users to display the first modified GUI.

Clause 9: The system of clause 8, wherein determining the probability that the first threshold number of users of the plurality of users will be late to the upcoming meeting is further based on one or more of a method of transportation, a speed of the method of transportation, historical scheduling data, historical location data, security system data, or combinations thereof.

Clause 10: The system of clause 8, wherein the instructions are further configured to cause the system to: responsive to determining the probability exceeds the predetermined threshold: modify the graphical user interface (GUI) of the respective user device associated with each of the plurality of users to generate a second modified GUI comprising a map of the location data; and cause the respective user device associated with each of the plurality of users to display the second modified GUI.

Clause 11: The system of clause 8, wherein the instructions are further configured to cause the system to: responsive to determining the probability exceeds the predetermined threshold: transmit, to the respective user device associated with each of the plurality of users, a first notification comprising one or more selectable user input objects; receive, from one or more of the respective user devices, a first selection of a first selectable user input object; and determine whether the one or more of the respective user devices exceeds a second threshold number of the respective user devices, wherein automatically converting the upcoming meeting to the virtual meeting is based on determining the one or more of the respective user devices exceeds the second threshold number.

Clause 12: A system comprising: one or more processors; and a memory in communication with the one or more processors and storing instructions that, when executed by the one or more processors, are configured to cause the system to: receive scheduling data associated with a user; receive location data corresponding to a user device associated with the user; determine whether the user has an upcoming meeting at a physical location based on the scheduling data; responsive to determining the user has the upcoming meeting at the physical location, determine a proximity of the user to the upcoming meeting by comparing a location of the user device to the physical location, the location based on the location data; determine, by a machine learning model (MLM) and based on the proximity, a probability that the user will be late to the upcoming meeting; determine whether the probability exceeds a predetermined threshold; responsive to determining the probability exceeds the predetermined threshold: automatically convert the upcoming meeting to a virtual meeting by generating a virtual meeting link; and transmit, to the user device, a first notification comprising the virtual meeting link.

Clause 13: The system of clause 12, wherein the scheduling data comprises one or more of calendar data, web conferencing data, email data, or combinations thereof.

Clause 14: The system of clause 12, wherein the location data comprises Global Positioning System (GPS) data.

Clause 15: The system of clause 12, wherein determining the probability that the user will be late to the upcoming meeting is further based on one or more of a method of transportation, a speed of the method of transportation, historical scheduling data, historical location data, security system data, or combinations thereof.

Clause 16: The system of clause 12, wherein the instructions are further configured to cause the system to: responsive to determining the probability exceeds the predetermined threshold: transmit, to the user device, a second notification comprising one or more selectable user input objects; and receive, from the user device, a first selection of a first selectable user input object, wherein automatically converting the upcoming meeting to the virtual meeting and transmitting the first notification are based on receiving the first selection.

Clause 17: The system of clause 12, wherein the instructions are further configured to cause the system to: determine one or more additional users associated with the upcoming meeting based on the scheduling data; and responsive to determining the probability exceeds the predetermined threshold: transmit a second notification to a respective user device associated with each of the one or more additional users, the second notification comprising the virtual meeting link.

Clause 18: The system of clause 12, wherein the instructions are further configured to cause the system to: determine a meeting organizer associated with the upcoming meeting based on the scheduling data, wherein the meeting organizer is different from the user; and responsive to determining the probability exceeds the predetermined threshold: transmit, to a second user device associated with the meeting organizer, a second notification comprising one or more selectable user input objects; and receive, from the second user device, a first selection of a first selectable user input object, wherein automatically converting the upcoming meeting to the virtual meeting and transmitting the first notification are based on receiving the first selection.

Clause 19: The system of clause 12, wherein the instructions are further configured to cause the system to: responsive to determining the probability exceeds the predetermined threshold: determine, by the MLM, one or more routes between the location of the user and the physical location; and transmit, to the user device, a second notification comprising the one or more routes.

Clause 20: The system of clause 19, wherein the instructions are further configured to cause the system to: responsive to determining the probability exceeds the predetermined threshold: determine, by the MLM, an amount of time associated with each of the one or more routes, wherein the amount of time is indicative of how long it may take the user to reach the physical location, and wherein the second notification further comprises the amount of time.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   receive scheduling data associated with a first user;
   receive location data corresponding to a first user device associated with the first user;
   determine whether the first user has an upcoming meeting at a physical location based on the scheduling data;
   responsive to determining the first user has the upcoming meeting at the physical location, determine a proximity of the first user to the upcoming meeting by comparing a location of the first user device to the physical location, the location based on the location data;
   determine, by a machine learning model (MLM) and based on the proximity and security system data, a probability that the first user will be late to the upcoming meeting;
   determine whether the probability exceeds a predetermined threshold;
   determine whether the first user is a necessary attendee for the upcoming meeting based on one or more factors comprising one or more of user feedback, whether the upcoming meeting has been previously postponed, or combinations thereof; and
   responsive to determining the probability exceeds the predetermined threshold and the first user is a necessary attendee for the upcoming meeting:
   transmit, to a second user device associated with a second user, a first notification comprising one or more selectable user input objects, a first selectable user input object of the one or more selectable user input objects providing a selectable user input for indicating whether to convert the upcoming meeting to a virtual meeting;
   receive, from the second user device, a first selection of a first selectable user input object indicating an instruction to convert the upcoming meeting to a virtual meeting; and
   responsive to receiving the first selection:
   convert the upcoming meeting to a virtual meeting by generating a virtual meeting link; and
   transmit, to the first and second user devices, a first notification comprising the virtual meeting link.

2. The system of claim 1, wherein the scheduling data comprises one or more of calendar data, web conferencing data, email data, or combinations thereof.

3. The system of claim 1, wherein the location data comprises Global Positioning System (GPS) data.

4. The system of claim 1, wherein determining the probability that the first user will be late to the upcoming meeting is further based on one or more of a method of transportation, a speed of the method of transportation, historical scheduling data, historical location data, or combinations thereof.

5. The system of claim 1, wherein the instructions are further configured to cause the system to:
   determine one or more additional users associated with the upcoming meeting based on the scheduling data; and responsive to determining the probability exceeds the predetermined threshold:
  transmit a second notification to a respective user device associated with each of the one or more additional users, the second notification comprising the virtual meeting link.

6. The system of claim 1, wherein the instructions are further configured to cause the system to:
responsive to determining the probability exceeds the predetermined threshold:
  determine, by the MLM, one or more routes between the location of the first user and the physical location; and
  transmit, to the first user device, a second notification comprising the one or more routes.

7. The system of claim 6, wherein the instructions are further configured to cause the system to:
responsive to determining the probability exceeds the predetermined threshold:
  determine, by the MLM, an amount of time associated with each of the one or more routes,
    wherein the amount of time is indicative of how long it may take the first user to reach the physical location, and
    wherein the second notification further comprises the amount of time.

8. The system of claim 1, wherein the one or more factors further comprise a title associated with the first user.

9. The system of claim 1, wherein determining whether the first user is a necessary attendee for the upcoming meeting is performed via the MLM.

10. The system of claim 1, wherein the security system data comprises key card information associated with the first user accessing a secure building.

11. A system, comprising:
one or more processors; and
a memory in communication with the one or more processors and storing instructions that, when executed by the one or more processors, are configured to cause the system to:
  receive scheduling data associated with a plurality of users, wherein the plurality of users are associated with an upcoming meeting;
  receive location data corresponding to a respective user device associated with each of the plurality of users;
  determine whether the upcoming meeting corresponds to a physical location based on the scheduling data;
  responsive to determining the upcoming meeting corresponds to the physical location, determine a respective proximity of each of the plurality of users to the upcoming meeting by comparing a respective location of each user device to the physical location, the respective location based on the location data;
  determine, by a machine learning model (MLM) and based on the respective proximity and security system data, a probability that a first threshold number of users of the plurality of users will be late to the upcoming meeting, wherein the probability comprises a percentage chance that the first threshold number of users of the plurality of users will be late to the upcoming meeting;
  determine whether the probability exceeds a predetermined threshold, wherein the predetermined threshold comprises a predetermined percentage chance that the first threshold number of users of the plurality of users will be late to the upcoming meeting;
  determine whether at least a first user of the plurality of users is a necessary attendee for the upcoming meeting based on one or more factors comprising one or more of user feedback, whether the upcoming meeting has been previously postponed, or combinations thereof, wherein the first user is part of the first threshold number of users that will be late to the upcoming meeting; and
  responsive to determining the probability exceeds the predetermined threshold and the first user is a necessary attendee for the upcoming meeting:
    automatically convert the upcoming meeting to a virtual meeting by generating a virtual meeting link;
    modify a graphical user interface (GUI) of the respective user device associated with each of the plurality of users to generate a first modified GUI comprising the virtual meeting link; and
    cause the respective user device associated with each of the plurality of users to display the first modified GUI.

12. The system of claim 11, wherein determining the probability that the first threshold number of users of the plurality of users will be late to the upcoming meeting is further based on one or more of a method of transportation, a speed of the method of transportation, historical scheduling data, historical location data, or combinations thereof.

13. The system of claim 11, wherein the instructions are further configured to cause the system to:
responsive to determining the probability exceeds the predetermined threshold:
  modify the graphical user interface (GUI) of the respective user device associated with each of the plurality of users to generate a second modified GUI comprising a map of the location data; and
  cause the respective user device associated with each of the plurality of users to display the second modified GUI.

14. The system of claim 11, wherein the instructions are further configured to cause the system to:
responsive to determining the probability exceeds the predetermined threshold:
  transmit, to the respective user device associated with each of the plurality of users, a first notification comprising one or more selectable user input objects;
  receive, from one or more of the respective user devices, a first selection of a first selectable user input object; and
  determine whether the one or more of the respective user devices exceeds a second threshold number of the respective user devices,
    wherein automatically converting the upcoming meeting to the virtual meeting is based on determining the one or more of the respective user devices exceeds the second threshold number.

15. A system comprising:
one or more processors; and
a memory in communication with the one or more processors and storing instructions that, when executed by the one or more processors, are configured to cause the system to:
  receive scheduling data associated with a user;
  receive location data corresponding to a user device associated with the user;
  determine whether the user has an upcoming meeting at a physical location based on the scheduling data;

responsive to determining the user has the upcoming meeting at the physical location, determine a proximity of the user to the upcoming meeting by comparing a location of the user device to the physical location, the location based on the location data;

determine, by a machine learning model (MLM) and based on the proximity and security system data, a probability that the user will be late to the upcoming meeting, wherein the probability comprises a percentage chance that the user will be late to the upcoming meeting;

determine whether the probability exceeds a predetermined threshold, wherein the predetermined threshold comprises a predetermined percentage chance that the user will be late to the upcoming meeting;

determine whether the user is a necessary attendee for the upcoming meeting based on one or more factors comprising one or more of user feedback, whether the upcoming meeting has been previously postponed, or combinations thereof; and responsive to determining the probability exceeds the predetermined threshold and the user is a necessary attendee for the upcoming meeting:
- automatically convert the upcoming meeting to a virtual meeting by generating a virtual meeting link; and
- transmit, to the user device, a first notification comprising the virtual meeting link.

16. The system of claim 15, wherein the instructions are further configured to cause the system to:
responsive to determining the probability exceeds the predetermined threshold:
- transmit, to the user device, a second notification comprising one or more selectable user input objects; and
- receive, from the user device, a first selection of a first selectable user input object,
  - wherein automatically converting the upcoming meeting to the virtual meeting and transmitting the first notification are based on receiving the first selection.

17. The system of claim 15, wherein the instructions are further configured to cause the system to:
determine one or more additional users associated with the upcoming meeting based on the scheduling data; and responsive to determining the probability exceeds the predetermined threshold:
- transmit a second notification to a respective user device associated with each of the one or more additional users, the second notification comprising the virtual meeting link.

18. The system of claim 15, wherein the instructions are further configured to cause the system to:
determine a meeting organizer associated with the upcoming meeting based on the scheduling data,
  wherein the meeting organizer is different from the user; and responsive to determining the probability exceeds the predetermined threshold:
- transmit, to a second user device associated with the meeting organizer, a second notification comprising one or more selectable user input objects; and
- receive, from the second user device, a first selection of a first selectable user input object,
  - wherein automatically converting the upcoming meeting to the virtual meeting and transmitting the first notification are based on receiving the first selection.

19. The system of claim 15, wherein the instructions are further configured to cause the system to:
responsive to determining the probability exceeds the predetermined threshold:
- determine, by the MLM, one or more routes between the location of the user and the physical location; and
- transmit, to the user device, a second notification comprising the one or more routes.

20. The system of claim 19, wherein the instructions are further configured to cause the system to:
responsive to determining the probability exceeds the predetermined threshold:
- determine, by the MLM, an amount of time associated with each of the one or more routes,
  - wherein the amount of time is indicative of how long it may take the user to reach the physical location, and
  - wherein the second notification further comprises the amount of time.

* * * * *